(12) United States Patent
Byrne

(10) Patent No.: US 12,026,517 B2
(45) Date of Patent: Jul. 2, 2024

(54) COMMUNICATING BETWEEN BROWSERS AND NATIVE APPLICATIONS

(71) Applicant: JPMorgan Chase Bank, N.A., New York, NY (US)

(72) Inventor: Timothy J. Byrne, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 395 days.

(21) Appl. No.: 17/557,728

(22) Filed: Dec. 21, 2021

(65) Prior Publication Data
US 2023/0195463 A1   Jun. 22, 2023

(51) Int. Cl.
*G06F 9/54* (2006.01)
*G06F 9/30* (2018.01)
*G06F 9/445* (2018.01)
*G06F 9/455* (2018.01)

(52) U.S. Cl.
CPC ...... *G06F 9/30174* (2013.01); *G06F 9/44526* (2013.01); *G06F 9/45529* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 11,397,594 B1* | 7/2022 | David | G06F 9/44526 |
| 2021/0141997 A1* | 5/2021 | Pinnamaneni | G06F 16/81 |
| 2021/0232439 A1* | 7/2021 | Fong | G06F 9/5083 |

* cited by examiner

*Primary Examiner* — Craig C Dorais
(74) *Attorney, Agent, or Firm* — GREENBLUM & BERNSTEIN, P.L.C.

(57) ABSTRACT

In one example of the present disclosure, a method for establishing communication between a browser and a native application is disclosed. The method may be initiated by executing a browser extension associated with the browser. The method may execute a native host to initiate startup of the native application. The native host may interface with the native application to establish bidirectional communication between the native host and the native application. The native host may also interface with the browser extension to establish bidirectional communication between the native host and the browser extension to connect the browser and the native application.

19 Claims, 6 Drawing Sheets

COMMUNICATING BETWEEN BROWSERS AND NATIVE APPLICATIONS

BACKGROUND

Native applications are software programs that are developed to run on a particular platform, e.g., on a specific operating system and/or processor. With their ability to access device-specific hardware or software for the designated platform, native applications can provide optimized and efficient performance relative to non-native applications.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

DETAILED DESCRIPTION

Although native applications can provide optimal performance when running on their intended platforms, performance beyond the confines of the designated platform can be poor. For example, some native applications cannot communicate with non-native applications that are running on a different platform. This inability to communicate is particularly true if the native platform was released many years ago.

Accordingly, examples of the present disclosure address the foregoing by providing a method for establishing communication between a browser and a native application. In one example, the method may be initiated by executing a browser extension associated with the browser. For some examples, the browser extension may be web-based programming language code instructions to add functionality to the browser.

Here, the method may also execute a native host to initiate startup of the native application. The native host may interface with the native application to establish bidirectional communication between the native host and the native application. The native host may also interface with the browser extension to establish bidirectional communication between the native host and the browser extension and to connect the browser and the native application.

In this manner, non-native applications that are running on different platforms can communicate with native applications. Communication between non-native platforms and native platforms can still occur even where a native application platform was released many years ago.

Figure 1:
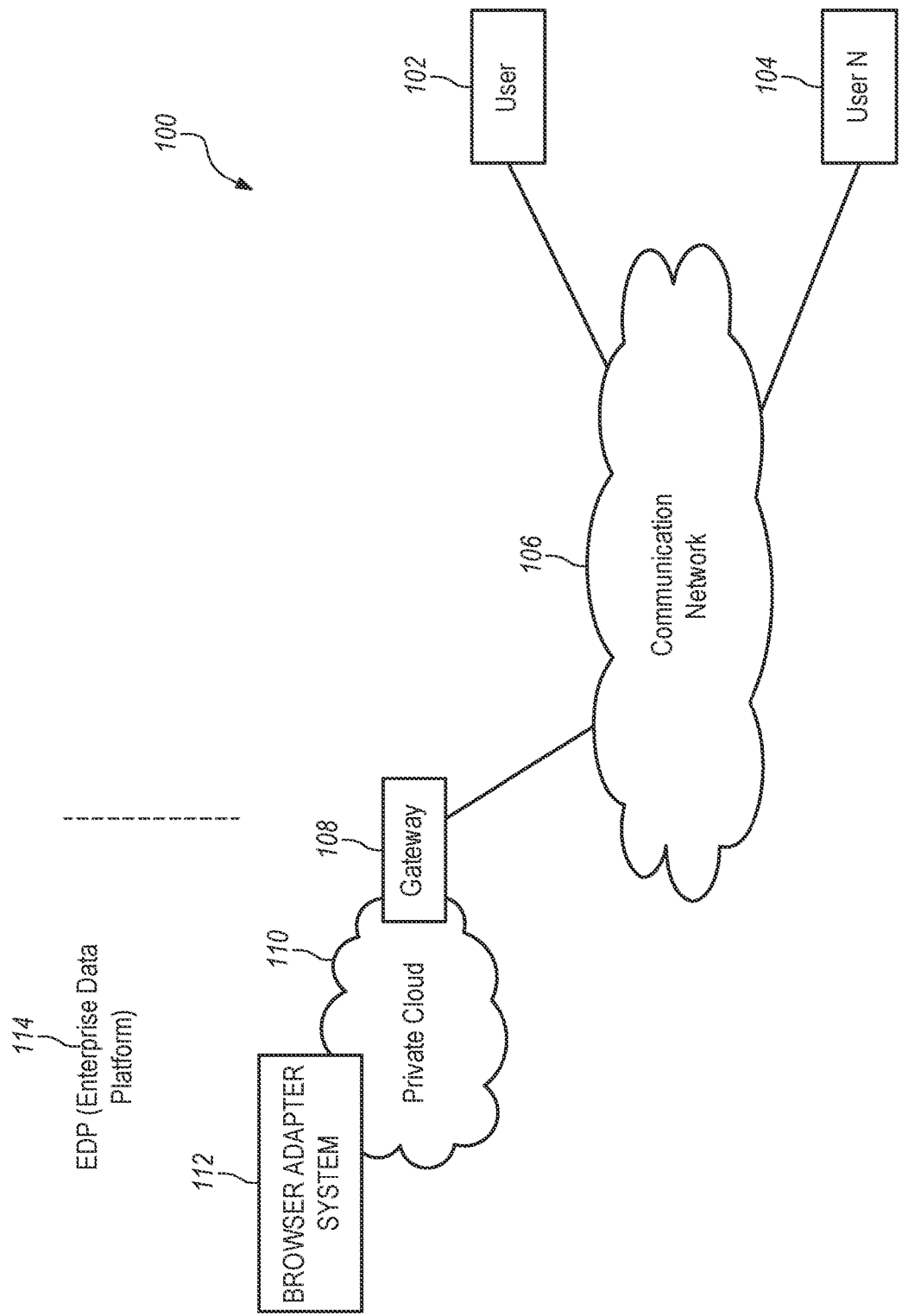
FIG. 1 illustrates a native application adaptive communication platform to facilitate browser communication with native applications according to an example of the present disclosure.

FIG. 1 illustrates a native application adaptive communication platform 100 to facilitate browser communication with native applications according to an example of the present disclosure.

In FIG. 1, native application adaptive communication platform 100 may include a plurality of users including user 102 and user N 104, all communicably coupled to a communication network 106. Communication network 106 can be any communication system that allows point-to-point communication between two or more end points of all data types including audio, video, etc., and any associated metadata. As an example, communication system 106 may comprise the Internet, etc.

In FIG. 1, a secure EDP (Enterprise Data Platform) 114 may be communicably coupled to communication network 106 via a gateway 108. Here, EDP 114 may be associated with an entity that provides products and services to consumers such as user 102 and user N 104. Such an entity may be a corporate entity that can utilize the EDP and communication network 106 to facilitate provision of goods and services to its consumers and clientele.

EDP 114 may comprise a browser adaptor system 112 and a private cloud 110 communicably coupled to communication network 106 via the gateway 108. As implied by its name, browser adaptor system 112 is to adapt browsers to facilitate communication with native applications, particularly, legacy native applications that have been in existence for many years. Browser adaptor system 112 will be more specifically described with reference to FIG. 2.

Figure 2:
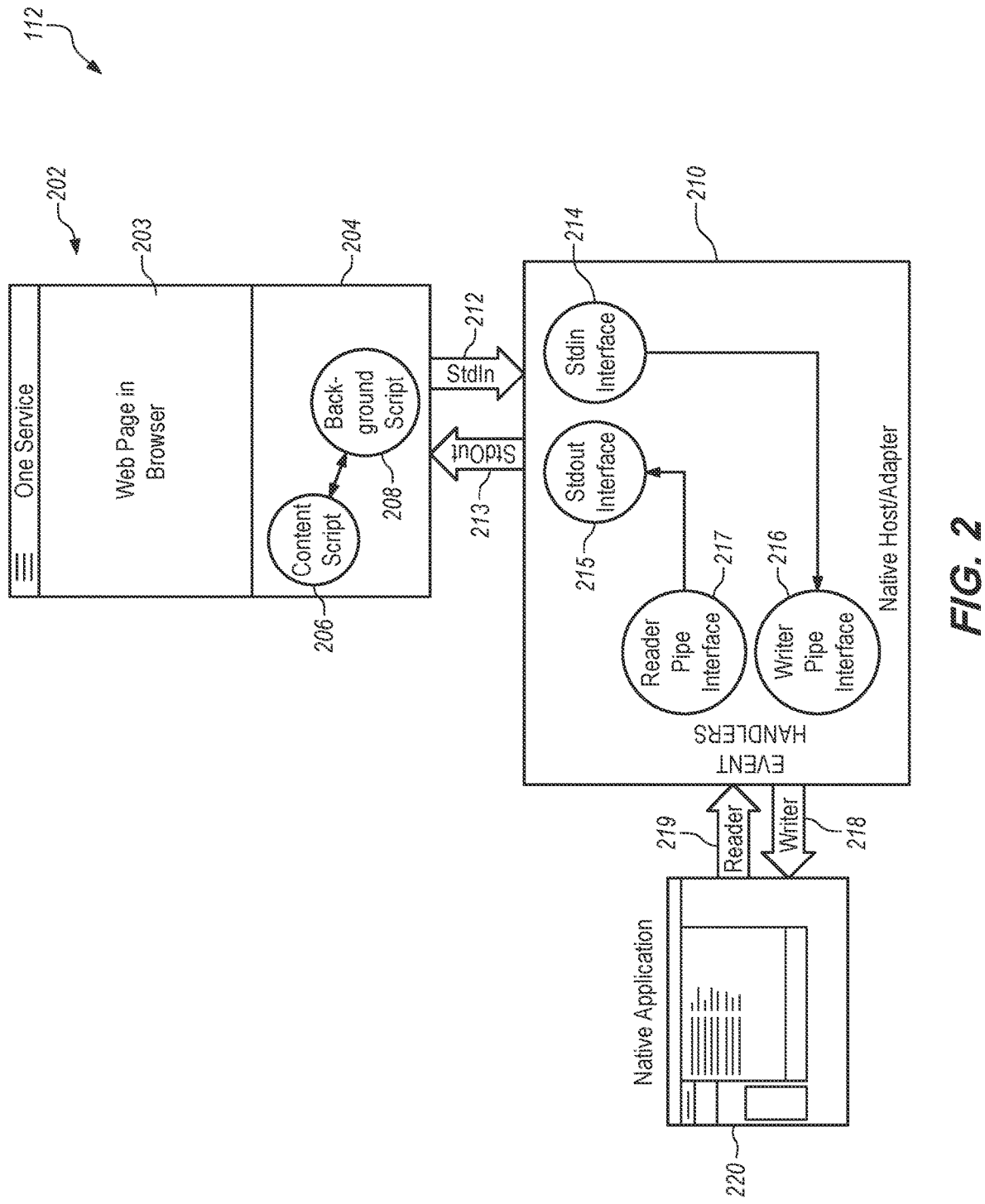
FIG. 2 illustrates an example of the browser adaptor system of FIG. 1.

FIG. 2 illustrates an example of the browser adaptor system 112 of FIG. 1. As noted, browser adaptor system 112 may facilitate communication between a browser 202 and native/legacy applications. As shown in FIG. 2, among other components, browser adaptor system 112 may include the browser 202 and a corresponding browser extension 204.

Here, browser 202 may be any browser that can interpret web objects/documents for display and execute web applications. An example of a browser 202 type may be Chrome™. Another example of browser 202 is Internet Explorer. Further yet, another example of browser 202 might be Firefox™. Other types of browsers may be employed. An example programming language that may be employed by browser 202 is JavaScript. Another example of a programming language may be HTML.

Here, the associated browser extension 204 may be source code to modify and enhance the capability of browser 202. An example capability that can be added is the opening of a new tab for browser 202.

Among other components, browser extension 204 may include content script 206 that can run in the context of web pages as well as a background script 208 programmed to react to browser events. For some examples, content script 206 is a JavaScript file that runs in the context of browser 202 web pages. In one example, content script 206 may be a module having code instructions thereon to run in the context of browser 202 web pages.

In other words, content script 206 can interact with the active part of web pages visited by browser 202. For a Chrome™ browser (for example), content script 206 is injected via a manifest.json file and by using a special <all_urls> URL pattern. Note, however, that content script 206 has limited access to events and WebExtension APIs.

On the other hand, background script 208 can access all events (e.g., user browser action click events) and WebExtension APIs. Thus, because background script 208 can access events and APIs, background script 208 may use message passing to communicate events indirectly to content script 206.

As shown in FIG. 2, browser adaptor system 112 also includes a native host/adaptor 210 and a native application 220. Here, native application 220 may be a computer software or program written for a particular platform and can function optimally within the confines of the platform. An example platform for native applications is Windows 95™ Another example of a platform is Mac OS X™.

Here, in one implementation, native application 220 can be launched by native host/adaptor 210 of FIG. 2. Specifically, native host/adaptor 210 includes software instructions to launch and adapt native application 220 for communication with browser 202. In fact, as shown, native host/adaptor 210 is interfaced with native application 220 to establish bidirectional communication between native host/adaptor 210 and native application 220.

Further, native host/adaptor 210 is also interfaced with browser extension 204 to establish bidirectional communication between native host/adaptor 210 and browser extension 204. In this manner, the present disclosure enables bidirectional communication between, on one hand, browser 202 executing the latest web applications and, on the other hand, native application 220 which may be a legacy application with such bidirectional communication being via the intermediary native host/adaptor 210.

In FIG. 2, native host/adaptor 210 may include a stdin (standard input) pipe 212 to communicate data from browser 202 to a stdin interface 214 of native application 220, and a stdout (standard output) pipe 213 to receive output data from a stdout interface 215 of native application 220 to browser 202.

Specifically, stdin interface 214 is communicably coupled to a writer pipe interface 216 of native host/adaptor 210 to write data from browser 202; stdout interface 215 is communicably coupled to reader pipe interface 217 of native application 220 to read output data intended for browser 202. Although the native application interface has been described with IPC named pipes, other communication protocols may be used. For example, TCP/IP sockets may be utilized for the native application interface. As another example, message queues may be used. Further yet, as another example, Unix domain sockets can be utilized. Operation of the browser adaptor system 112 will now be described with reference to FIG. 3.

Figure 3:
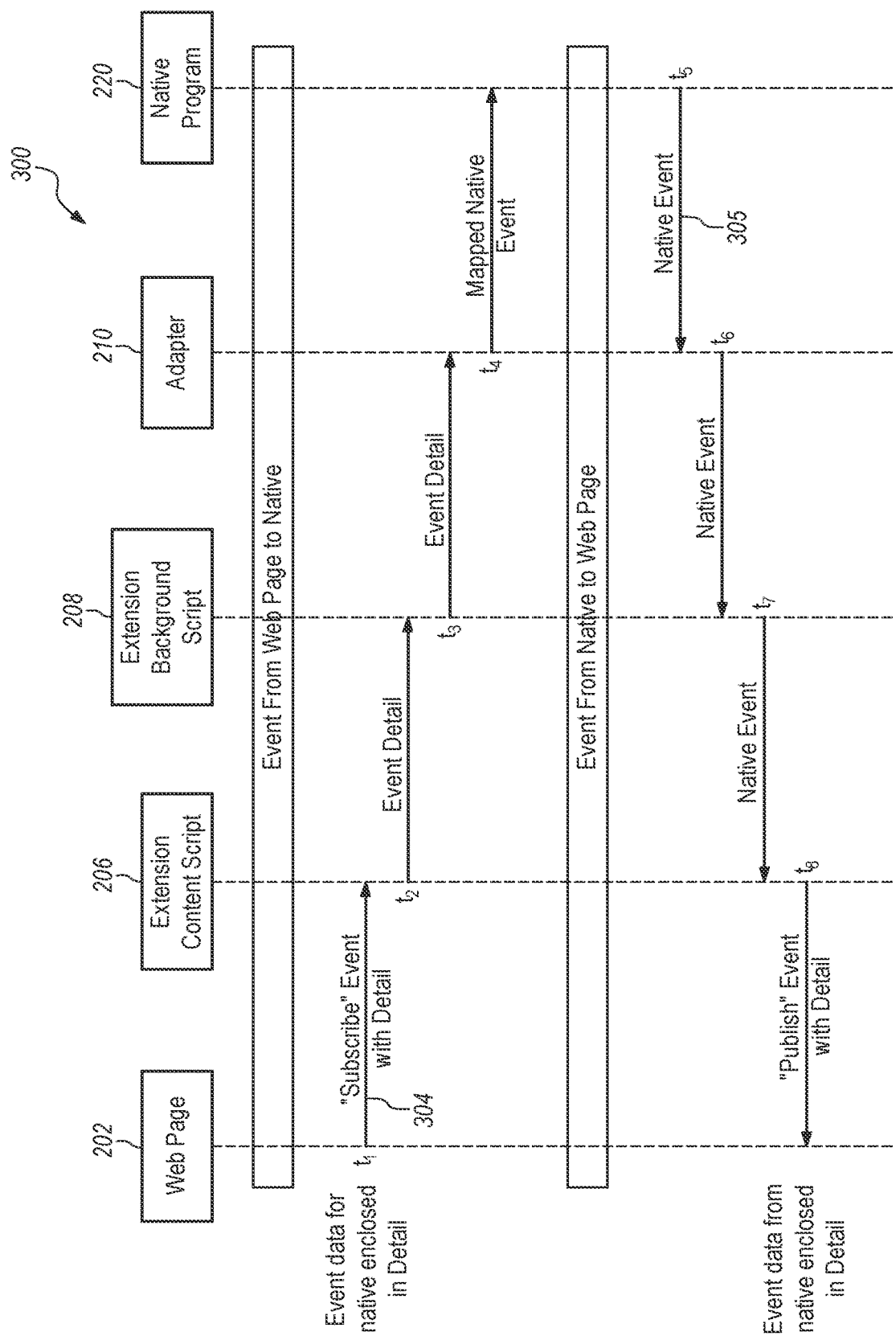
FIG. 3 illustrates a sequence diagram between components of the browser adaptor system of FIG. 2.

FIG. 3 illustrates an event sequence diagram 300 between components of the browser adaptor system 112 of FIG. 2. Specifically, sequence diagram 300 illustrates event sequences between a web page 203 (rendered by browser 202 of FIG. 2) and native application 220 (of FIG. 2).

Specifically, at t1, a subscribe event 304 may be generated for communication from web page 203 to native application 220. Here, the subscribe event 304 itself may be received from a source (not shown) such as a phone call from a customer support desk application rendered by web page 203 (as an example). Once received, subscribe event 304 is published by web page 203 with details of the event data.

At t2, subscribe event 304 is received by extension content script 206. Within browser 202, web page 203 when rendered may have Java script or context associated with it. It is within this Java script context that the active part of web page 203 is running. Here, the extension content script 206 may access the DOM (Document Access Model) of web page 203. DOM refers to the object rendering of HTML web page elements (buttons, text fields, etc.).

In other words, extension content script 206 receives access to the same DOM that web page 203 has. Thus, when web page 203 publishes the subscribe event 304, extension content script 206 can receive it through the DOM.

Thus, as noted, at t2, extension content script 206 receives the subscribe event, identifies that it is for native application 220, and sends subscribe event 304 to extension background script 208. A port (not shown) opens between extension content script 206 and extension background script 208 so that extension background script 208 can receive the subscribe event 304.

Note that extension background script 208 was previously initiated by browser 202 at startup, so that extension background script 208 is already running when the subscribe event 304 is received. Contemporaneously, at startup, extension background script 208 also opens a native port (not shown) to start the native host/adaptor 210 process on the user's computer system.

At t3, extension background script 208 sends the subscribe event 304 to the native port for native host/adaptor 210. The subscribe event 304 is sent via stdin pipe 212 (FIG. 2) to the stdin interface 214 (FIG. 2) of native host/adaptor 210.

At t4, native host/adaptor 210 then examines the subscribe event 304 and determines whether it is for native application 220. This determination is made by examining the event detail to determine what kind of event it is.

In this example, the event detail includes a "launch" event; the event handler for the launch event then determines that native application 220 should be launched. Once it is determined that subscribe event 304 is for native application 220, subscribe event 304 is formatted and mapped so it is recognizable by native application 220 and can be treated like a legacy event.

The mapped event is then sent from writer pipe interface 216 (FIG. 2) through writer pipe 218 (FIG. 2) to native application 220. In this manner, the present disclosure makes no change to the native application 220 but still facilitates communication from web page 203 to native application 220.

According to examples of the present disclosure, native application 220 can be executed to run in a legacy manner. Startup and shut down of native application 220 can occur from web page 203. For example, to initiate startup of native application 220, web page 203 may transmit a "launch native application 220" event.

That launch event may be propagated to native host/adaptor 210, which then executes startup of native application 220. In an example legacy Windows 95 environment, native host/adaptor 210 can access and launch the native application's Windows executable.

At t5, the flow from native application 220 (FIG. 2) to web page 203 is similar to the above-described process except that the native event (published) 305 is generated by native application 220. Native event 305 is sent via reader pipe 219 (FIG. 2) to reader pipe interface 217 (FIG. 2) of native host/adaptor 210.

At t6, native host/adaptor 210 writes native event 305 from reader pipe interface 217 (FIG. 2) to stdout interface 215 (FIG. 2), which then sends it to the native port of extension background script 208. The event handler here then sees the message (native event 305) and at t7, writes native event 305 to the port for extension content script 206.

At t8, extension content script 206 receives and publishes the native event 305 to web page 203. According to some examples, a publish/subscribe interface of the present disclosure can communicate with a broadcast channel API for clients to send/receive data.

In general, in one example implementation, a browser may start up and navigate to a web application URL. A browser extension for the browser may connect to a native port which starts an adaptor. The adaptor maintains stdin and stdout connections back to the browser. The web application may send a command to launch a native application. The browser extension may receive the command for forwarding to the adaptor. The adaptor receives the command to launch the native application and executes the native application launch sequence. The native application connects back to the adaptor. The web app events/commands can be received by native application and the native application events/commands can be received by web application.

Figure 4:
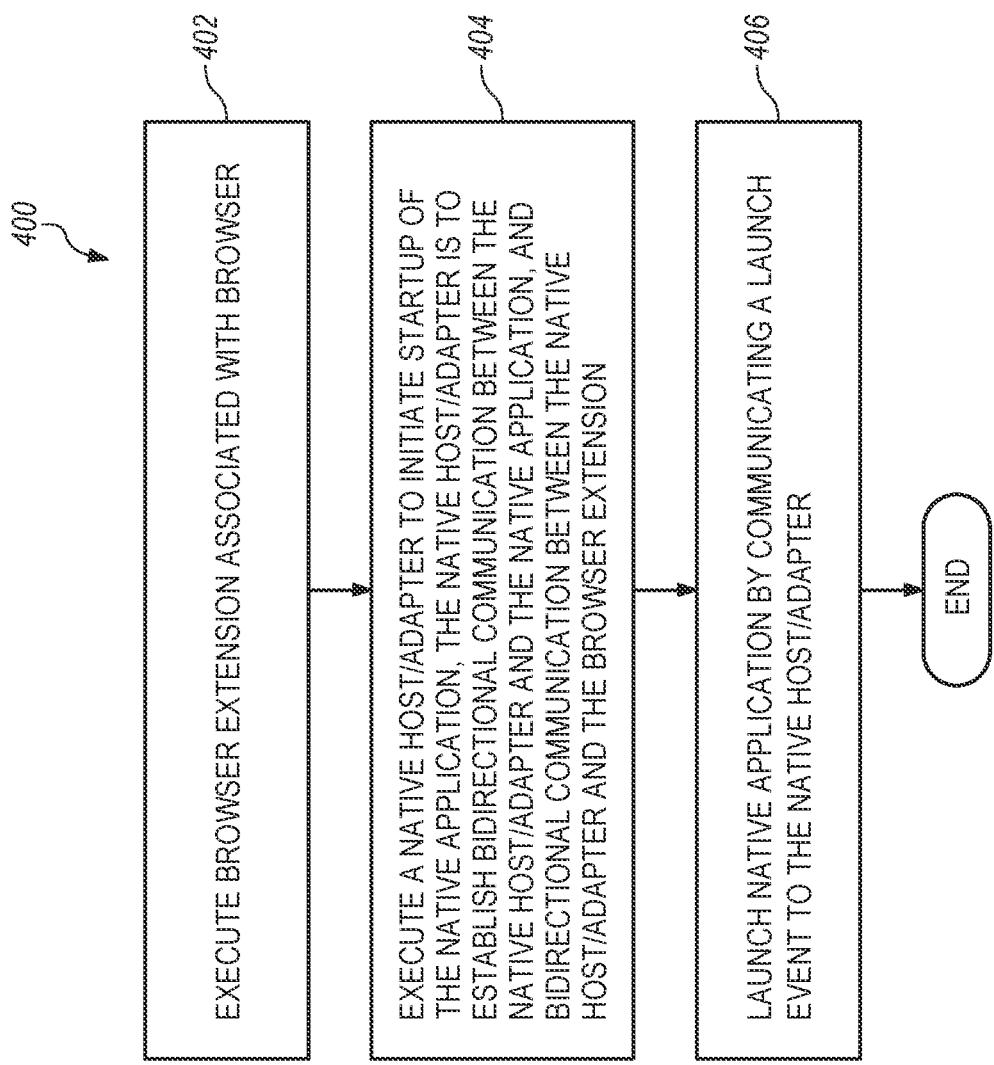
FIG. 4 illustrates a method 400 for establishing communication between the browser and the native application of FIG. 2.

FIG. 4 illustrates a method 400 for establishing communication between browser 202 (FIG. 2) and native application 220 (FIG. 2).

In one example, at block 402, method 400 is initiated by executing browser extension 204 of FIG. 2 associated with browser 202 also of FIG. 2.

At block 404, method 400 executes native host/adaptor 210 (FIG. 2) to initiate startup of the native application 220. For some examples, native host/adaptor 210 may interface with the native application 220 to establish bidirectional communication between the native host/adaptor 210 and the native application 220. The native host/adaptor 210 further interfaces with browser extension 204 to establish bidirectional communication between the native host/adaptor 210 and the browser extension 204 to connect browser 202 and the native application 220.

As used herein, the term bidirectional communication refers to signaling, functioning, communicating in or from two (usually) opposite directions. In one example, the bidirectional communication may be synchronous. In another example, the bidirectional communication may be asynchronous.

Referring to FIG. 4, at block 406, method 400 may launch the native application 220 by communicating a launch event to native host/adaptor 210. When the launch event is received, native host/adaptor 210 opens a native application port to launch the native application 220. For some examples, native application 220 may be launched by running a native application 220 executable. An example of such an executable may be a Windows™ executable in a Windows 95 native environment.

Figure 5:
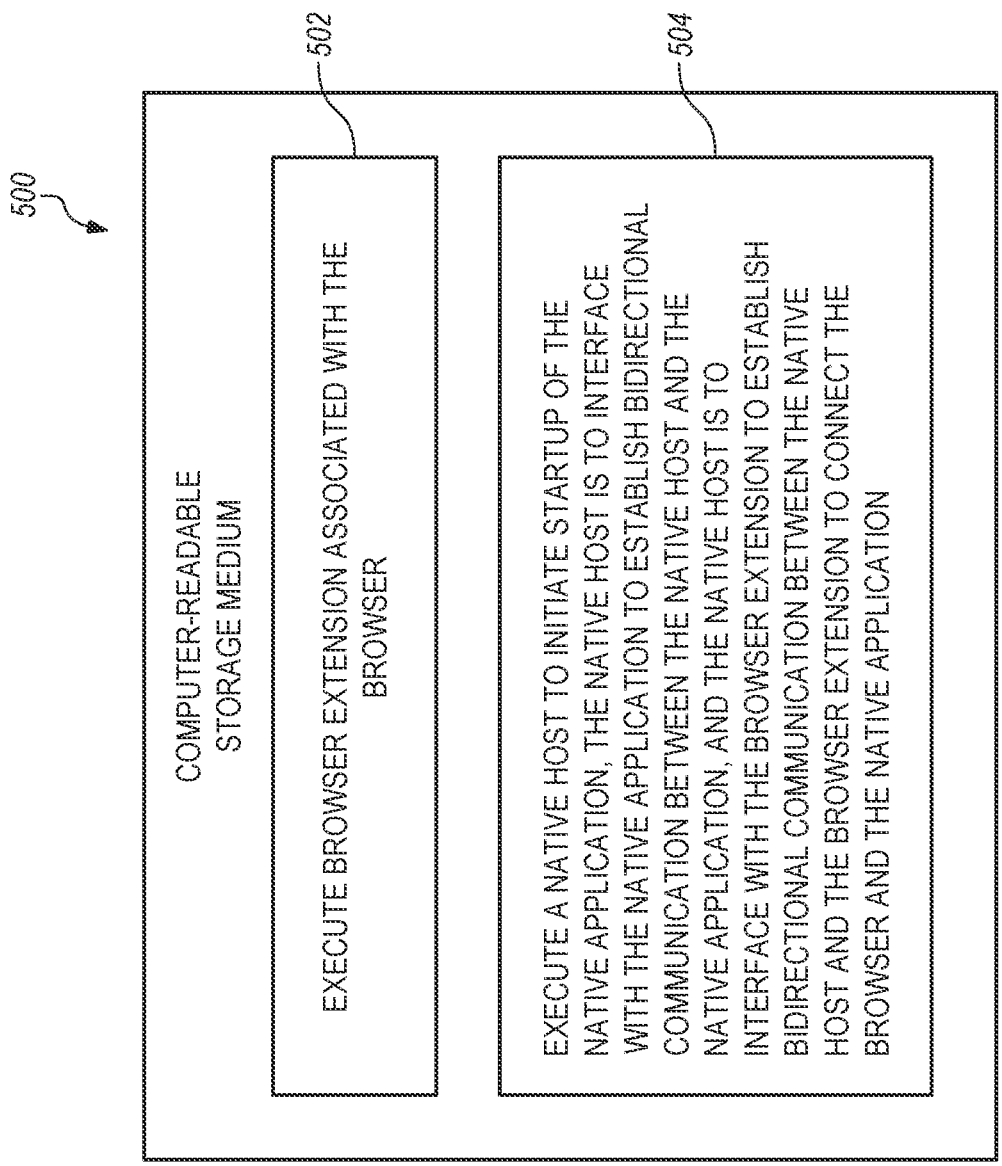
FIG. 5 illustrates a non-transitory computer-readable storage medium for a computer program product for establishing communication between the browser and the native application of FIG. 2.
Figure 6:
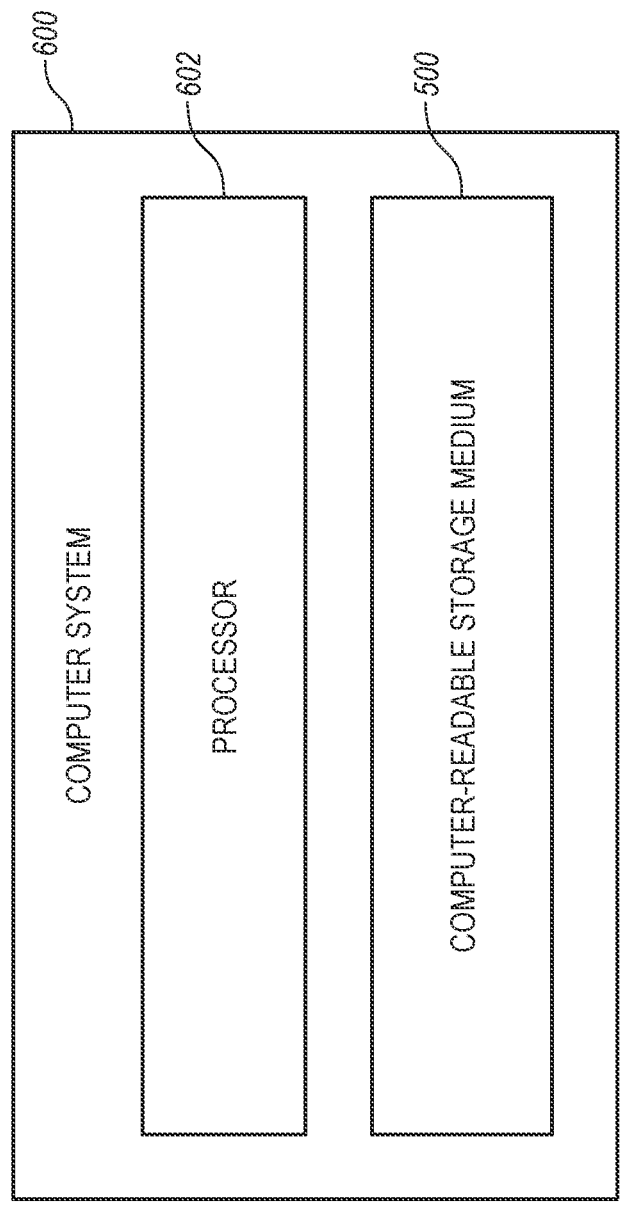
FIG. 6 illustrates a computer system according to an example of the present disclosure.

FIG. 5 illustrates a non-transitory computer-readable storage medium 500 for a computer program product for establishing communication between browser 202 (FIG. 2) and native application (FIG. 2). The non-transitory computer-readable storage medium 500 has stored thereon code instructions 502 and 504, which may be executed by a processor 602 (FIG. 6). As shown in FIG. 6, processor 602 and the non-transitory computer-readable storage medium 500 may be part of the computer system 600.

In FIG. 5, code instructions 502 may cause processor 602 to execute browser extension 204 associated with browser 202.

Code instructions 504 may cause processor 602 to execute native host/adaptor 210 to initiate startup of the native application 220. Note that the native host/adaptor 210 may interface with the native application 220 to establish bidirectional communication between the native host/adaptor 210 and the native application 220. It is also noted that the native host/adaptor 210 may interface with browser extension 204 to establish bidirectional communication between the native host/adaptor 210 and the browser extension 204 to connect browser 202 and the native application 220.

In one example, the native application 220 may be launched by communicating a launch event to the native host/adaptor 210. And, upon receiving the launch event, the native host/adaptor 210 opens a native application port (not shown) to launch the native application 220.

For some examples, the native application 220 may be launched by running a native application executable. In one example, the native host/adaptor 210 receives event data from the browser extension 204 and reformats the event data for use by the native application 220.

As an example of such reformatting, the native application 220 may be asked to display account information and may be sent the following event:

{"event":"viewAccount", "data":[{"key":"accountNum", "value":"1111222233334444"},{"key":"callerType", "value":"spouse"}]}

Because the native application 220 is expecting to receive the same command with a different layout, the event is reformatted as follows so the native application 220 can receive it.

{"Command":"openAccount",
 "Content":{"cardNum":"1111222233334444","callerType":"spouse"}}

The native host/adaptor 210 may also receive event data from the native application 220 and reformat the event data for use by the browser 202.

The non-transitory computer-readable storage medium 500 may be any electronic, magnetic, optical, or other physical storage device that stores executable instructions. For example, the non-transitory computer-readable storage medium 500 may be random access memory (RAM), an electrically-erasable programmable read-only memory (EEPROM), a storage drive, an optical disc, or the like. The non-transitory computer-readable storage medium 500 can be encoded to store executable instructions that cause a processor to perform operations according to examples of the disclosure.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, AngularJS, and Node.js) stack may be employed. In another example, a LAMP (Linux, Apache, MySQL, and PHP) stack may be utilized.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit.

Any suitable programming language can be used to implement the routines of particular examples including C, C++, Java, JavaScript, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. A method for establishing communication between a browser and a native application, the method comprising:
   executing a browser extension associated with the browser, wherein the browser extension includes a content script module and a background script module; and
   executing a native host to initiate startup of the native application, wherein the native host is to interface with the native application to establish bidirectional communication between the native host and the native application, and wherein the native host is to interface with the browser extension to establish bidirectional communication between the native host and the browser extension to connect the browser and the native application.

2. The method of claim 1 wherein the native application is launched by communicating a launch event to the native host.

3. The method of claim 2 wherein upon receiving the launch event, the native host opens a native application port to launch the native application.

4. The method of claim 3 wherein the native application is launched by running a native application executable.

5. The method of claim 1 wherein the native host receives event data from the browser extension and reformats the event data for use by the native application.

6. The method of claim 1 wherein the native host receives event data from the native application and reformats the event data for use by the browser.

7. The method of claim 1 wherein the native host includes a standard in (stdin) interface coupled to a writer pipe interface for communicating an event to the native application.

8. The method of claim 1 wherein the native host includes a standard out (stdout) interface coupled to the reader pipe interface for communicating an event from the native application to the browser.

9. A computer program product for establishing communication between a browser and a native application, the computer program product embodied in a non-transitory computer-readable storage medium embodied having stored thereon code instructions, which when executed by a processor, cause the processor to:
   execute a browser extension associated with the browser, wherein the browser extension includes a content script module and a background script module; and
   execute a native host to initiate startup of the native application, wherein the native host is to interface with the native application to establish bidirectional communication between the native host and the native application, and wherein the native host is to interface with the browser extension to establish bidirectional communication between the native host and the browser extension to connect the browser and the native application.

10. The computer program product of claim 9, wherein the native application is launched by communicating a launch event to the native host.

11. The computer program product of claim 10 wherein upon receiving the launch event, the native host opens a native application port to launch the native application.

12. The computer program product of claim 11 wherein the native application is launched by running a native application executable.

13. The computer program product of claim 9 wherein the native host receives event data from the browser extension and reformats the event data for use by the native application.

14. The computer program product of claim 9 wherein the native host receives event data from the native application and reformats the event data for use by the browser.

15. The computer program product of claim 9 wherein the native host includes a standard in (stdin) interface coupled to a writer pipe interface for communicating an event to the native application.

16. The computer program product of claim 9 wherein the native host includes a standard out (stdout) interface coupled to the reader pipe interface for communicating an event from the native application to the browser.

17. A system for establishing communication between a browser and a native application, the system comprising:
   a browser extension associated with the browser, wherein the browser extension includes a content script module and a background script module; and
   a native host module to receive a subscribe event from the content script module via the background script module, wherein the native host module is to interface with the native application to establish bidirectional communication between the native host module and the native application to communicate the subscribe event to the native application, and wherein the native host module is to interface with the browser extension to establish bidirectional communication between the native host module and the browser extension to connect the browser and the native application.

18. The system of claim 17 wherein the native application is launched by communicating a launch event from the background script module to the native host.

19. The system of claim 18 wherein upon receiving the launch event, the native host opens a native application port to launch the native application.

* * * * *